United States Patent
Takamori et al.

(10) Patent No.: US 10,803,426 B2
(45) Date of Patent: Oct. 13, 2020

(54) DAMAGE INFORMATION EXTRACTION DEVICE, DAMAGE INFORMATION EXTRACTION METHOD, AND DAMAGE INFORMATION EXTRACTION PROGRAM

(71) Applicant: FUJIFILM Corporation, Tokyo (JP)

(72) Inventors: Tetsuya Takamori, Tokyo (JP); Satoshi Kubota, Tokyo (JP); Masayuki Negoro, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 256 days.

(21) Appl. No.: 15/905,579

(22) Filed: Feb. 26, 2018

(65) Prior Publication Data

US 2018/0189749 A1 Jul. 5, 2018

Related U.S. Application Data

(63) Continuation of application No. PCT/JP2016/074008, filed on Aug. 17, 2016.

(30) Foreign Application Priority Data

Sep. 10, 2015 (JP) .................. 2015-178454

(51) Int. Cl.
*G06Q 10/00* (2012.01)
*G01N 21/88* (2006.01)
(Continued)

(52) U.S. Cl.
CPC ............ *G06Q 10/20* (2013.01); *G01M 99/00* (2013.01); *G01N 21/88* (2013.01); *G01N 21/95* (2013.01); *G06Q 50/08* (2013.01)

(58) Field of Classification Search
CPC .................................................. G06Q 10/20
(Continued)

(56) References Cited

U.S. PATENT DOCUMENTS

2012/0311053 A1* 12/2012 Labrie .................. G06Q 10/06
709/206
2014/0100889 A1* 4/2014 Tofte .................. G06K 9/00791
705/4
(Continued)

FOREIGN PATENT DOCUMENTS

JP H10-021211 A 1/1998
JP 2006-338312 A 12/2006
(Continued)

OTHER PUBLICATIONS

Extended European Search Report issued by the European Patent Office dated Sep. 17, 2018, which corresponds to EP16844139.2-1217 and is related to U.S. Appl. No. 15/905,579.

(Continued)

*Primary Examiner* — Ricky Ngon
(74) *Attorney, Agent, or Firm* — Studebaker & Brackett PC

(57) ABSTRACT

An inspection specifying unit acquires structure information of a building that is an inspection target. Use environment history information of the building that is an inspection target is acquired. The inspection specifying unit specifies a member position that is an inspection target and a type of damage that is an inspection target at the member position on the basis of the structure information of the building and the use environment history information. An inspection data acquisition unit acquires inspection data including image data obtained by imaging a subject image of each member and position information of each member. An inspection data analysis unit acquires the image data corresponding to the member position from the inspection data acquisition unit, analyzes the image data, and determines whether there is damage of the damage type specified as the inspection (Continued)

target, and a degree of damage in a case where there is the damage.

20 Claims, 6 Drawing Sheets

(51) Int. Cl.
*G06Q 50/08* (2012.01)
*G01M 99/00* (2011.01)
*G01N 21/95* (2006.01)

(58) Field of Classification Search
USPC .......................................................... 702/34
See application file for complete search history.

(56) References Cited

U.S. PATENT DOCUMENTS

| | | | |
|---|---|---|---|
| 2014/0336928 A1 | 11/2014 | Scott | |
| 2015/0073864 A1* | 3/2015 | Labrie | G06Q 40/08 705/7.29 |
| 2016/0282230 A1 | 9/2016 | Poser et al. | |

FOREIGN PATENT DOCUMENTS

| | | |
|---|---|---|
| JP | 4279159 B2 | 6/2009 |
| JP | 2010-133835 A | 6/2010 |
| JP | 2011-048760 A | 3/2011 |
| JP | 2014-159981 A | 9/2014 |
| WO | 2015/062646 A1 | 5/2015 |

OTHER PUBLICATIONS

International Search Report; issued in PCT/JP2016/074008; dated Sep. 27, 2016.
Written Opinion; issued in PCT/JP2016/074008; dated Sep. 27, 2016.
International Preliminary Report on Patentability; issued in PCT/JP2016/074008; dated Mar. 13, 2018.
Yu Otake et al., Statistical study on evaluating bridge health degree based on bridge inspection database, Mar. 8, 2011, I_813-I_824, vol. 67, No. 2 (Applied Mechanics Papers vol. 14).
Communication pursuant to Article 94(3) EPC issued by the European Patent Office dated Jun. 19, 2020, which corresponds to European Patent Application No. 16 844 139.2-1213 and is related to U.S. Appl. No. 15/905,579.

* cited by examiner

FIG. 2

| NAME | DATE OF COMPLETION | DATE OF START OF SERVICE | ACCIDENT | MAINTENANCE PERFORMANCE PLACE AND DATE | ...... |
|---|---|---|---|---|---|
| O×BRIDGE | ○MONTH △△DAY ××YEAR | □MONTH △×DAY ○○YEAR | ×MONTH O×DAY O□YEAR FLOOD | △△MONTH ×○DAY □□YEAR MAIN GIRDER STEEL PORTION COATING | ...... |

| NAME | STRUCTURE | IMAGE DATA | MEMBER | | | |
|---|---|---|---|---|---|---|
| | | | UPPER STRUCTURE | LOWER STRUCTURE | SUPPORT | OTHERS |
| O×BRIDGE | 2 SPAN CONTINUOUS STEEL FLOOR BOX GIRDER BRIDGE | XXXX.jpg | MAIN GIRDER: STEEL TRANSVERSE GIRDER: STEEL SLAB: PC | ABUTMENT: RC PIER: RC | RUBBER | BRIDGE FALL PREVENTION APPARATUS: CABLE |

POSITION
INFORMATION
  X= .....
  Y= .....
  Z= .....

POSITION
INFORMATION
  X= .....
  Y= .....
  Z= .....

POSITION
INFORMATION
  X= .....
  Y= .....
  Z= .....

DAMAGE INFORMATION EXTRACTION DEVICE, DAMAGE INFORMATION EXTRACTION METHOD, AND DAMAGE INFORMATION EXTRACTION PROGRAM

CROSS-REFERENCE TO RELATED APPLICATIONS

This application is a Continuation of PCT International Application No. PCT/JP2016/074008 filed on Aug. 17, 2016, which claims priority under 35 U.S.C § 119(a) to Japanese Patent Application No. 2015-178454 filed on Sep. 10, 2015. Each of the above application(s) is hereby expressly incorporated by reference, in its entirety, into the present application.

BACKGROUND OF THE INVENTION

1. Field of the Invention

The present invention relates to a device, a method, and a non-transitory computer recordable recording medium storing a program for extracting damage information of a building, and more particularly, to a device, a method, and a non-transitory computer recordable recording medium storing a program for extracting damage information of a building for diagnosing soundness of the building.

2. Description of the Related Art

Determining soundness of buildings such as bridges, tunnels, or buildings from results of inspection of the buildings is performed in the related art. The inspection is performed as observation of a deformation phenomenon such as cracks, and causes of the deformation are specified on the basis of information on the inspection, a surrounding environment, design information of the building, or the like, and the determination of the soundness is performed.

In order to accurately perform the determination of the soundness, advanced and extensive expertise and long analysis time are required. Therefore, a system for supporting the determination of the soundness has been considered.

JP2010-133835A describes capturing an infrared image of a surface of a bridge slab and specifying a flaw detection position (damage inspection position) from the infrared image.

JP2006-338312A discloses displaying an option of a type of damage that can be input, to an investigator using an option table indicating a correspondence relationship between a member of a bridge and a type of damage (inspection target damage) that may occur in the member. Accordingly, damage classification related to a combination of a type of work, a member, and a material, an evaluation item of a degree of damage corresponding to the damage classification, and an evaluation criterion are presented to an investigator as options, and a guideline causing an investigator to evaluate each damage is given. Further, JP2006-338312A describes that a manager causes the investigator to capture a photograph after sending an advice to the investigator.

JP4279159B describes a system for estimating causes of a deformation on the basis of deformation information, structure information, and information on surroundings of a building and determining soundness. That is, a crack caused by external force among cracks in tunnel lining is automatically picked up from a deformation development view, and collated with 50 or more types of crack deformation patterns in advance to check which of the crack deformation patterns the crack corresponds to, and an external force acting on the tunnel is estimated on the basis of the corresponding crack deformation pattern and basic information such as a ground condition of surroundings, a geological condition, a construction condition at the time of construction, and a structure condition. Further, dynamical soundness of the tunnel is determined on the basis of information on the basic information together with the estimated causes of the deformation.

In Basic Study on Evaluation of Soundness of Bridges on the basis of Bridge Inspection Database Using Statistical Scheme, Proceedings of Civil Engineering Association A2 (Applied Mechanics), Vol. 67, No. 2 (Applied Mechanics Papers Vol. 14), I_813-I_824, 2011, a contribution rate (weight) to the soundness of each component is calculated by performing main component analysis on an evaluation result of each inspection item, and the soundness of the component is evaluated using one or two indicators from a large number of inspection items.

SUMMARY OF THE INVENTION

In recent years, aging of social infrastructures has become a problem. At the time of maintenance of an aged social infrastructure, it is preferable for an inspector with expertise to inspect each place of the infrastructure in detail. However, there are restrictions caused by a budget, personnel, and a place or the number of installed infrastructures, and it is difficult to instantaneously inspect all infrastructures. Therefore, a mechanism for easily and rapidly performing inspection with a focused main point for distinguish between serious damage requiring urgent measures and non-serious damage is required.

In JP2010-133835A, a damage position of a bridge slab is specified using an infrared image, but a damage position of a partial structure (a main girder, a bridge pier, an expansion and contraction device, or the like) other than the bridge slab cannot be specified.

In JP2006-338312A, since evaluation itself is performed by an investigator, the investigator must have expertise. Further, since the investigator has to confirm evaluation items and evaluation criteria one by one for the combination of the type of work, the member, and the material, it takes time to inspect at the site.

In JP4279159B, a determination of the soundness is performed from information on a deformation or damage of the entire building regardless of a difference in an influence of the deformation or the damage of the building on a strength or the soundness of the building according to a part of occurrence or a type of damage. Therefore, in order to determine the soundness of the building, it is necessary to perform inspection of the entire building, which requires a large effort. Further, in JP4279159B, since the influence according to the part or the type of damage is not evaluated, an accurate determination cannot be performed. Further, JP4279159B does not specifically describe how to estimate causes of the deformation from basic information of the tunnel. Therefore, a determination of mechanical soundness depends on the estimation of the causes of the deformation considering the basic information of the tunnel by a technician with expertise. Therefore, each technician must estimate the causes of the deformation for each tunnel that is an inspection target, and it is difficult to secure the technician.

The present invention has been made in view of the above circumstances, and an object of the present invention is to provide a damage information extraction device, a damage information extraction method, and a non-transitory computer recordable recording medium storing a damage information extraction program capable of performing soundness evaluation of an entire building by specifying important positions and important damage of the building and evaluating the important damage at the important position.

In order to solve the above problem, a damage information extraction device according to a first aspect of the present invention includes a structure information acquisition unit that acquires structure information of a building; an inspection specifying unit that specifies an inspection position of the building and a type of inspection target damage on the basis of the structure information of the building acquired by the structure information acquisition unit; an inspection data acquisition unit that acquires inspection data in which image data in which the inspection position of the building is set as a subject and the inspection position of the building are associated with each other; and a damage information extracting unit that extracts damage information corresponding to the type of inspection target damage specified by the inspection specifying unit from the image data corresponding to the inspection position specified by the inspection specifying unit among the inspection data acquired by the inspection data acquisition unit.

In this aspect, since the inspection position of the building and the type of inspection target damage are specified on the basis of the structure information of the building, and the damage information corresponding to the type of inspection target damage specified by the inspection specifying unit is extracted from the image data corresponding to the specified inspection position, it is possible to extract the damage information from the important position on the structure of the building. Since it suffices that image data in which the inspection position of the building is a subject and the inspection position of the building are associated with each other in the inspection data, it is not necessary to specifically inspect unspecified members one by one at an inspection site of the building, and it is possible to achieve both rapidness and accuracy of the inspection.

In the damage information extraction device according to a second aspect of the present invention, the structure information acquisition unit acquires structure information of the building from the image data in which the building is set as a subject. By doing this, it is possible to easily inspect buildings of which design books or the like is not left.

In the damage information extraction device according to a third aspect of the present invention, the damage information includes a position of damage and a degree of the damage corresponding to the type of inspection target damage.

The damage information extraction device according to a fourth aspect of the present invention further comprises: a storage unit that stores soundness information in which structure information, a position of damage, a degree of damage, and soundness of one or a plurality of buildings other than the building are associated with one another; and a soundness determination unit that searches for soundness corresponding to the structure information, the position of damage, and the degree of damage of the other building similar to the structure information, the position of the damage, and the degree of the damage of the building, and determining the soundness of the building on the basis of the soundness of the other building that has been searched for.

The damage information extraction device according to a fifth aspect of the present invention further comprises a soundness output unit that outputs the soundness of the building determined by the soundness determination unit.

The damage information extraction device according to a sixth aspect of the present invention further comprises: a soundness confirmation input unit that receives a confirmation input regarding suitability of the soundness of the building output by the soundness output unit; and a storage control unit for storing the soundness of the building determined by the soundness determination unit in the storage unit in association with the structure information, the position of the damage, and the degree of the damage of the building, or for correcting the soundness of the building determined by the soundness determination unit and storing the corrected soundness of the building in the storage unit in association with the structure information, the position of the damage, and the degree of the damage of the building according to the confirmation input regarding suitability of the soundness of the building of which the input is received by the soundness confirmation input unit.

The damage information extraction device according to the seventh aspect of the present invention further comprises: a use environment information acquisition unit that acquires use environment information of the building, wherein the inspection specifying unit specifies the inspection position of the building and the type of inspection target damage on the basis of the structure information of the building acquired by the structure information acquisition unit and the use environment information of the building acquired by the use environment information acquisition unit.

The damage information extraction device according to an eighth aspect of the present invention further comprises: a storage unit that stores soundness information in which structure information, a position of damage, a degree of damage, use environment information, and soundness of one or a plurality of buildings other than the building are associated with one another; and a soundness determination unit that searches for soundness corresponding to the structure information, the position of damage, the degree of damage, and use environment information of the other building similar to the structure information, the position of the damage, the degree of damage, and the use environment information of the building and determining the soundness of the building on the basis of the soundness of the other building that has been searched for.

The damage information extraction device according to a ninth aspect of the present invention further comprises: a soundness output unit that outputs the soundness of the building determined by the soundness determination unit.

The damage information extraction device according to a tenth aspect of the present invention further comprises: a soundness confirmation input unit that receives a confirmation input regarding suitability of the soundness of the building output by the soundness output unit; and a storage control unit that stores the soundness of the building determined by the soundness determination unit in the storage unit in association with the structure information, the position of the damage, the degree of the damage, and use environment information of the building, or for correcting the soundness of the building determined by the soundness determination unit and storing the corrected soundness of the building in the storage unit in association with the structure information, the position of the damage, the degree of the damage, and use environment information of the building according to the confirmation input regarding suitability of the soundness of the building of which the input is received by the soundness confirmation input unit.

In the damage information extraction device according to an eleventh aspect of the present invention, the soundness output unit outputs a part or all of the soundness information on the soundness of the other building that has been searched for together with the soundness of the building.

In a damage information extraction method according to a twelfth aspect of the present invention which is executed by a computer, the method comprising: a structure information acquisition step of acquiring structure information of a building; an inspection specifying step of specifying an inspection position of the building and a type of inspection target damage on the basis of the structure information of the building acquired in the structure information acquisition step; an inspection data acquisition step of acquiring inspection data in which image data in which the inspection position of the building is set as a subject and the inspection position of the building are associated with each other; and a damage information extracting step of extracting damage information corresponding to the type of inspection target damage specified in the inspection specifying step from the image data corresponding to the inspection position specified in the inspection specifying step among the inspection data acquired in the inspection data acquisition step.

A non-transitory computer recordable recording medium storing a damage information extraction program for causing a computer to execute the damage information extraction method is also included in the aspect of the present invention.

In the present invention, since the inspection position of the building and the type of inspection target damage are specified on the basis of the structure information of the building, and the damage information corresponding to the type of inspection target damage specified in the inspection specifying step is extracted from the image data corresponding to the specified inspection position, it is possible to extract the damage information from the important position on the structure of the building. Since it suffices that image data in which the inspection position of the building is a subject and the inspection position of the building are associated with each other in the inspection data, it is not necessary to specifically inspect unspecified members one by one at an inspection site of the building, and it is possible to achieve both rapidness and accuracy of the inspection.

BRIEF DESCRIPTION OF THE DRAWINGS

FIG. 2 is a diagram illustrating an example of use environment history information that is accumulated in a use environment history information DB.

DESCRIPTION OF THE PREFERRED EMBODIMENTS

Figure 1:
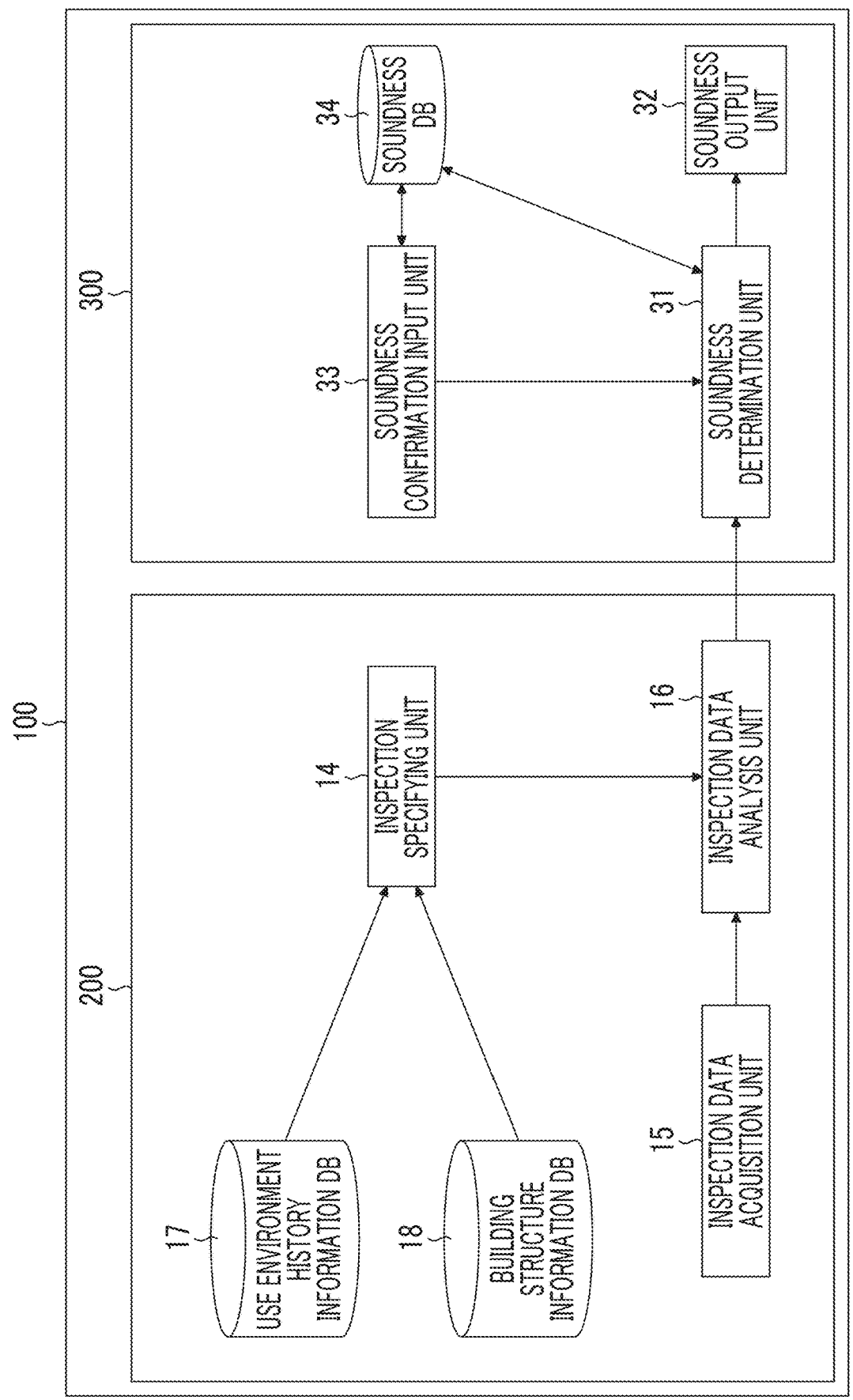
FIG. 1 is a block diagram illustrating a schematic configuration of a soundness determination system.

FIG. 1 is a block diagram illustrating a schematic configuration of a soundness determination system 100 to which the present invention is applied. The soundness determination system 100 includes a damage information extraction device 200 and a soundness determination device 300. The damage information extraction device 200 includes an inspection specifying unit 14, an inspection data acquisition unit 15, an inspection data analysis unit 16, a use environment history information database (DB) 17, and a building structure information database (DB) 18. Further, the soundness determination device 300 includes a soundness determination unit 31, a soundness output unit 32, a soundness confirmation input unit 33, and a soundness database (DB) 34.

Each unit of the damage information extraction device 200 and each unit of the soundness determination device 300 can be configured as a known information processing device, such as a personal computer, a smartphone, a mobile phone, or a tablet terminal, including a processor, a random access memory (RAM), a flash memory, a read only memory (ROM), a display, a speaker, a touch panel, a communication interface, and the like. Further, the damage information extraction device 200 and the soundness determination device 300 may be configured as separate information processing devices, or may be configured as an integrated information processing device. In a case where the damage information extraction device 200 and the soundness determination device 300 are configured as separate information processing devices, a known communication interface connecting both is provided in each of the damage information extraction device 200 and the soundness determination device 300 such that both can perform communication. In a case where the damage information extraction device 200 and the soundness determination device 300 are integrally configured, the soundness determination system 100 is the same as the damage information extraction device 200 or the soundness determination device 300.

As illustrated in FIG. 2, the use environment history information accumulated in the use environment history information DB 17 is information indicating a use environment and a use history of the building. For example, in a case where the building is a bridge, the use environment history information includes a name, date of completion of the bridge, date of start of service of the bridge, presence or absence of an accident affecting a structure of the building such as typhoon, earthquake, flood, concentrated torrential rain, fire, or collision of an object, date of the accident, a maintenance performance place and date of maintenance performance, an average temperature and humidity after the start of service, a cumulative amount of traffic, and a position of an abnormal place found in the past.

Although not illustrated, the use environment history information DB 17 may accumulate the use environment history information of a plurality of different buildings, or may accumulate the use environment history information of one building that is an inspection target.

Figure 3:
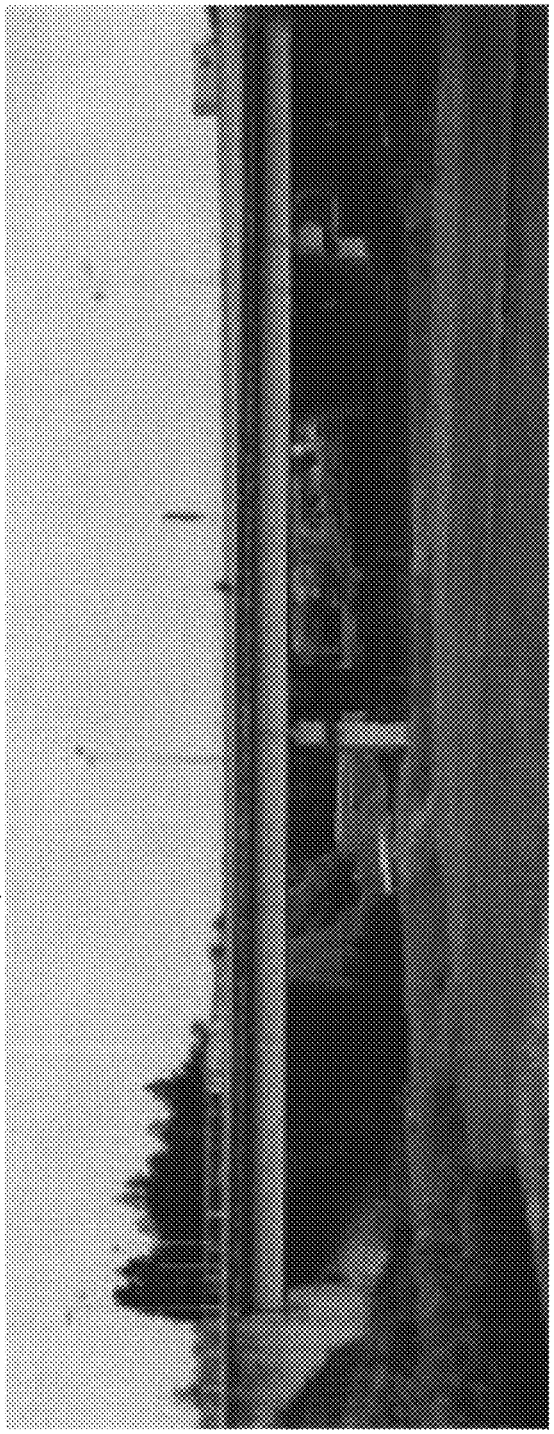
FIG. 3 is a diagram illustrating an example of building structure information accumulated in a building structure information DB.

As illustrated in FIG. 3, the data accumulated in the building structure information DB 18 includes a design book or a completion drawing of an arbitrary building that is an inspection target, a name, a structure format of the building, image data in which an appearance of a structure of an arbitrary building that is an inspection target is recorded, a structure and a material of each part of the building, a structural positional relationship between respective parts of the building, and the like. Although not illustrated, the building structure information DB 18 may accumulate structure information of a plurality of different buildings or may accumulate structure information of one building that is an inspection target.

For example, in a case where the building is a bridge, a format of a basic structure of the building is a girder bridge, a truss bridge, an arch bridge, a suspension bridge, a Rahmen bridge, or the like.

For materials of respective parts of the girder bridge, a main girder and a cross girder of an upper structure of the girder bridge are made of steel, a slab is made of prestressed concrete (PC), a support is made of rubber, and a lower structure is a reinforced concrete (RC) pile foundation or direct foundation.

Figure 4:
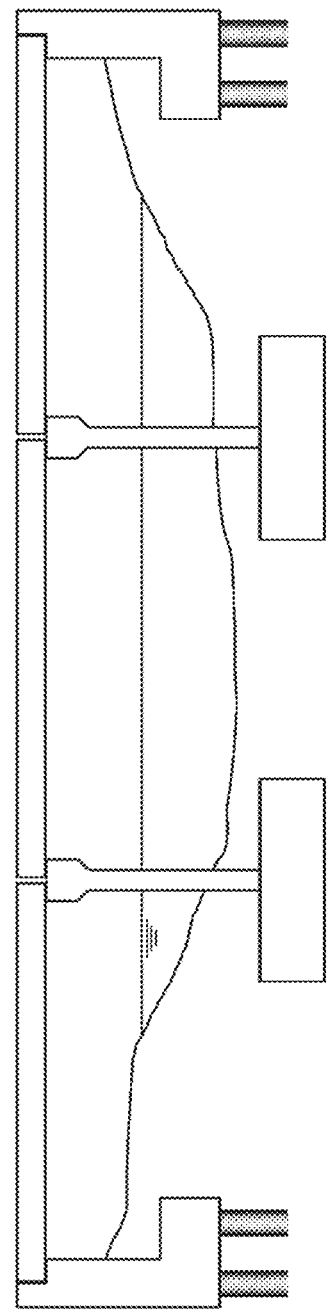
FIG. 4 is a diagram illustrating an example of a structure model of a building.

In a case where a design book or a completion drawing of a building that is an inspection target cannot be acquired, the inspection specifying unit 14 can compare an entire external appearance photograph (see FIG. 3) of the building that is an inspection target with a structure model (see FIG. 4) of a typical structure registered in the building structure information DB 18, and determine the structure information of the building that is an inspection target. This can be done by human work, or can be automated or semi-automated by input work to a computer or a process using the computer. In a case where a design book or a completion drawing of a building that is an inspection target can be acquired, these can be accumulated in the building structure information DB 18 as building structure information as they are. However, since the design book or the completion drawing may be different from actual construction results or a current state may be different from the design book or the completion drawing due to repair or replacement of members, these may be included in the structure information of the building, if possible. A structure information acquisition unit corresponds to the above function of the inspection specifying unit 14.

The inspection specifying unit 14 specifies a member position that is a member position that is an inspection target among constituent members of the building, and a type of damage that is an inspection target at the member position on the basis of the structure information of the building and the use environment history information. This is for narrowing down the inspection targets at an important member position in the structure. Therefore, the member position that is the inspection target preferably is a pinpoint-like fixed point, but it may be a range having a spatial extent. As an example, a method of specifying the member position and the type of damage that are inspection targets are as follows. An inspection specifying unit corresponds to the above-described function of the inspection specifying unit 14.

(1) It is assumed that a format of a basic structure of the building that is the inspection target being a girder bridge, a main girder and a cross girder of an upper structure of the girder bridge being made of steel, a slab being made of concrete, and a support being made of rubber are defined in the structure information of building accumulated in the building structure information DB 18.

In the use environment history information accumulated in the use environment history information DB 17, it is assumed that a place of use is defined as being within 1 km (coastal portion) from a coast.

In this case, the inspection specifying unit 14 determines a steel member in a central portion between spars of a main girder of an upper structure of the girder bridge to be the member position that is an inspection target, and also determines corrosion, rupture, crack, deflection, and dropout of bolt or nut of the steel member in the central portion between the spars of the main girder to be a type of damage to be extracted from the member position that is the inspection target. This is because, in a case where the place of use is a coastal portion, occurrence of damage related to salt damage is predicted, but the central portion between the spars of the main girder that is particularly over-weighted in a structural mechanics is intensively inspected instead of inspecting the entire steel members.

(2) In a case where the place of use is a mountainous portion, a snow melting agent is sprayed on a road surface. Therefore, occurrence of salt damage at a slab is expected. Accordingly, in this case, the inspection specifying unit 14 determines a lower surface of the slab to be the member position that is an inspection target, and determines cracks of the lower surface of the slab, and peeling and floating of the concrete as the type of damage that is the inspection target.

(3) It is assumed that flood is defined to be present in the use environment history information accumulated in the use environment history information DB 17. In this case, the inspection specifying unit 14 determines a pier foundation portion to be the member position that is an inspection target on the basis of the fact that there is flood, and also determines scouring, subsidence, moving, and inclination of the pier foundation portion to be the type of damage.

(4) It is assumed that presence of an earthquake with a seismic intensity of 5 or more is defined in the use environment history information accumulated in the use environment history information DB 17. In this case, the inspection specifying unit 14 determines a pier foundation portion as the member position that is the inspection target, and determines subsidence, moving, and sloping of the pier foundation portion as the types of damage that are the inspection target. Even in a case where there is no earthquake of seismic intensity of 5 or more in the use environment history information, the inspection specifying unit 14 similarly determines subsidence, moving, and sloping of the pier foundation portion as the types of damage that are the inspection target in a case where a soft ground of the pier foundation portion is defined.

(5) It is assumed that presence of a reinforcing portion in a cross girder is defined in the use environment history information accumulated in the use environment history information DB 17. In this case, the inspection specifying unit 14 determines the reinforcing portion of the cross girder to be the member position that is the inspection target, and also determines rupture of a reinforcing member of the cross girder and cracks of the cross girder near the reinforcing member as the types of damage that are the inspection target.

(6) In a case where the use environment history information is not accumulated in the use environment history information DB 17, the position of a member important in terms of structural mechanics, such as a central portion of the girder, a cross girder and vertical girder joint portion is determined to be the member position that is an inspection target, and a typical deformation occurring in the member position such as cracks, ruptures, rusts, or bolt dropouts is determined as the type of damage that is an inspection target. That is, the use environment history information may not be indispensable for specifying the member position and the type of damage that are inspection targets. The term "inspection" used herein does not necessarily include only skills or decision of personnel with expertise for buildings, but includes simple work such as capturing images at the site.

Figure 5A:
FIGS. 5A to 5C are diagrams illustrating an example of inspection data.
Figure 5B:
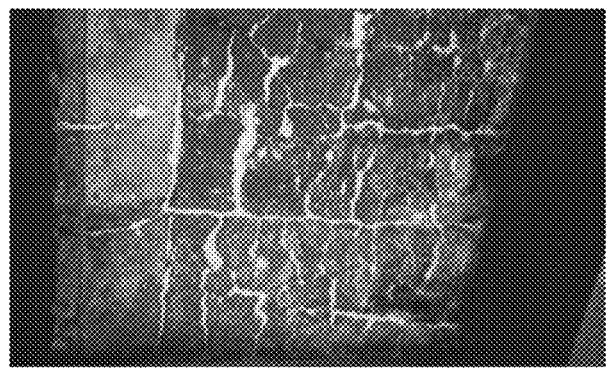
Figure 5C:
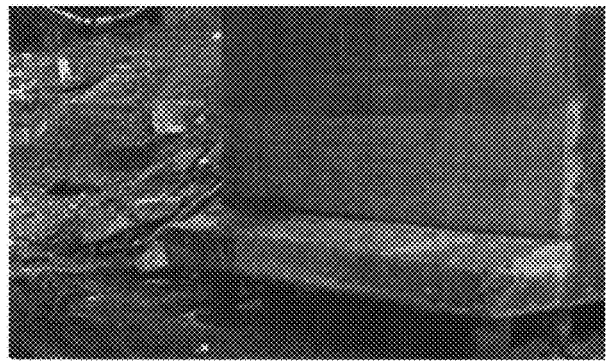

As illustrated in FIGS. 5A to 5C, the inspection data acquired by the inspection data acquisition unit 15 includes image data in which each member of an arbitrary building that is an inspection target is a subject, and position information of each member of which the image is recorded. FIG. 5A illustrates image data in which a longitudinal girder and a cross girder are subjects, FIG. 5B illustrates image data in which a lower surface of a slab is a subject, and FIG. 5C illustrates image data in which a pier foundation portion is a subject. The position information of these members may be based on position information obtained by a global positioning system (GPS). For example, image data associated with the position information of members is recorded by a person carrying a camera with a GPS or a drone or a robot having a camera with a GPS mounted thereon. An inspection data acquisition unit corresponds to the above function of the inspection data acquisition unit 15.

In a case where a subject image of each member of a building is recorded by a camera, all the members may be evenly included in the image data, and a photographer or an imaging device need not to selectively image important members and non-important members. That is, at the time of imaging, it is unnecessary to select an imaging place, but instead, it is necessary to recognize and image the subject without omitting each member of the building.

Since information on a position of each member present in the building rather than position information on the earth of the member is required in a damage information extraction process to be described below, it is necessary for the position information on the earth to be converted into relative position information on the building at a local coordinate set in the building that is an inspection target. For example, this conversion is performed by converting the position information on the earth into coordinates appropriately set on the building (for example, XYZ coordinates with a start point of the bridge as an origin). This can be realized by simple linear conversion. Hereinafter, it is assumed that the position information of the member included in the inspection data is the position information of the member in the building.

The inspection data acquisition unit 15 may acquire the inspection data from a movable device such as a drone or a robot on which the above-described camera with a GPS has been mounted, or may be a device in which the inspection data acquisition unit 15 itself generates the inspection data.

The inspection data analysis unit 16 acquires the image data corresponding to the member position specified as the inspection target by the inspection specifying unit 14 from the inspection data acquisition unit 15, analyzes the image data, and determines whether or not there is damage of the type of damage specified as the inspection target and a degree of damage in a case where there is the damage, from the image data. Hereinafter, information indicating the presence or absence of the damage and the degree of damage is referred to as damage information. A damage information extraction unit corresponds to the above function of the inspection data analysis unit 16.

For example, a width, a length, and an area of a range of cracking, peeling, or rebar exposure of the slab, the number per unit area of the rebar exposure, a length of deflection of the main girder, an area of corrosion of a steel member of the main girder, a length of a crack, the number of dropouts of a bolt or a nut, and a length of scouring, subsidence, moving, and sloping of a pier are determined by analyzing an image in which a member at the inspection position is a subject. In a case where a scale is imaged together with the image, it is easy to determine the degree of damage regarding the length, the width, and the range. Further, using various types of image analysis, it is possible to identify a difference in color between the damage and a surrounding sound place thereof and determine a damage range accompanied by a change in color of corrosion, lime precipitation, rebar exposure, or the like. In a case where image analysis cannot be performed, damage information may be determined through manual input of the user.

The soundness determination unit 31 determines the soundness of the building that is an inspection target on the basis of the degree of damage at each member position analyzed by the inspection data analysis unit 16. The soundness of the building is stepwise or numerical evaluation of safety of the building.

A soundness determination rule in the soundness determination unit 31 is as follows, for example. First, the soundness determination unit 31 determines any one of three stages of "remarkable partial deterioration", "partial deterioration", and "no deterioration" from the degree of damage of the individual member positions that are inspection targets to be soundness for each individual inspection target position. In a case where the number of inspection target positions determined to be "remarkable partial deterioration" exceeds a prescribed number A such as 9, the soundness determination unit 31 determines the soundness of the entire building to be "overall remarkable deterioration".

In a case where the number of inspection target positions determined to be "remarkable partial deterioration" is equal to or greater than a prescribed number B and equal to or smaller than the specified number A, for example, between 5 to 9, the soundness determination unit 31 determines the soundness of the entire building to be "remarkable partial deterioration".

In a case where the number of inspection target positions determined to be "remarkable partial deterioration" is equal to or greater than 1 and equal to or smaller than the specified number B, for example, between 1 to 4, the soundness determination unit 31 determines the soundness of the entire building to be "partial deterioration".

In a case where the number of inspection target positions determined to be "remarkable partial deterioration" is 0, the soundness determination unit 31 determines that the soundness of the entire building to be "no deterioration".

A classification of the soundness is not limited to the above, and the classification may be less than three stages or four or more stages. Further, content of the classification is not limited to the above, and for example, the soundness may be classified into four stages such as "no requirement of measures", "monitoring requirement", "immediate measures requirement", and "urgent countermeasure requirement".

For the determination of the soundness in consideration of the degree of damage of each member, a reference of the determination is defined as a rule in advance as described above, or other methods are also possible. For example, it is also possible to perform the determination of the soundness in consideration of the degree of damage of each member or the environment of use of the building in the soundness determination unit 31 using a statistical scheme such as that in Basic Study on Evaluation of Soundness of Bridges on the basis of Bridge Inspection Database Using Statistical Scheme, Proceedings of Civil Engineering Association A2 (Applied Mechanics), Vol. 67, No. 2 (Applied Mechanics Papers Vol. 14), I_813-I_824, 2011.

Alternatively, soundness information in which structure information, a position of the damage, a degree of damage, and soundness of one or a plurality of buildings other than the building that is an inspection target are associated with one another may be stored in the soundness DB 34, and the soundness determination unit 31 may search for soundness corresponding to the structure information, the position of damage, and the degree of damage of the other building similar to the structure information, the position of the damage, and the degree of the damage of the building that is an inspection target from the soundness database 34, and determine the soundness of the building that is an inspection target on the basis of the soundness of the other building that has been searched for. A distance between the building that is an inspection target and the other building in a feature space having the structure information of the building, the position of damage, and the degree of damage as feature vectors is calculated, and the similarity can be determined according to a magnitude of the distance. For example, the soundness of the other building giving a minimum value of this distance is determined as the soundness of the building that is an inspection target. This distance may be an unweighted distance (Euclidean distance) or may be a weighted distance (Mahalanobis distance). Which weight is assigned to which parameter may be determined by a statistical scheme such as main component analysis as in Basic Study on Evaluation of Soundness of Bridges on the basis of Bridge Inspection Database Using Statistical Scheme, Proceedings of Civil Engineering Association A2 (Applied Mechanics), Vol. 67, No. 2 (Applied Mechanics Papers Vol. 14), I_813-I_824, 2011. Further, it is preferable for the soundness stored in the soundness DB 34 to be determined by personnel with expertise. A value obtained by performing simple averaging or weighted averaging on the soundness of a plurality of buildings of which the distance is equal to or smaller than a certain threshold value can also be determined to be the soundness of the building that is an inspection target. This threshold value can be optimized using a statistical scheme.

Further, for example, soundness information in which structure information, a position of the damage, a degree of damage, use environment history information, and soundness of one or a plurality of buildings other than the building that is an inspection target are associated with one another may be stored in the soundness DB 34, and the soundness determination unit 31 may search for soundness corresponding to the structure information, the position of damage, the degree of damage, and the use environment history information of the other building similar to the structure information, the position of the damage, the degree of damage, and the use environment history information of the building that is an inspection target from the soundness database 34, and determine the soundness of the building that is an inspection target on the basis of the soundness of the other building that has been searched for. The similarity can be determined according to a magnitude of a distance between the building that is an inspection target and the other building in a feature space having the structure information of the building, the position of damage, the degree of damage, and the use environment history information as feature vectors. For example, the soundness of the other building giving a minimum value of this distance is determined as the soundness of the building that is an inspection target. This distance may be an unweighted distance (Euclidean distance) or may be a weighted distance (Mahalanobis distance). Which weight is assigned to which parameter may be determined by a statistical scheme such as main component analysis as in Basic Study on Evaluation of Soundness of Bridges on the basis of Bridge Inspection Database Using Statistical Scheme, Proceedings of Civil Engineering Association A2 (Applied Mechanics), Vol. 67, No. 2 (Applied Mechanics Papers Vol. 14), I_813-I_824, 2011. Further, it is preferable for the soundness stored in the soundness DB 34 to be determined by personnel with expertise. A value obtained by performing simple averaging or weighted averaging on the soundness of a plurality of buildings of which the distance is equal to or smaller than a certain threshold value can also be determined to be the soundness of the building that is an inspection target. This threshold value can be optimized using a statistical scheme. A storage unit corresponds to the above function of the soundness DB 34. Further, the soundness determination unit corresponds to the above function of the soundness determination unit 31.

The soundness output unit 32 includes a display, a printer, a speaker, and the like, and converts the soundness of the entire building determined by the soundness determination unit 31 into an image, a text, sound, or the like, and outputs the image, the text, the sound, or the like. The soundness output unit 32 may output all or some of structure information, a position of the damage, a degree of damage, and use environment history information of one or a plurality of other buildings similar to the structure information, the position of the damage, the degree of damage, and the use environment history information of the building that is an inspection target together as a representative example. A soundness output unit corresponds to the above function of the soundness output unit 32.

The soundness confirmation input unit 33 requests a user to confirm whether the soundness of the entire building determined by the soundness determination unit 31 is appropriate or to be corrected and to input a result of the confirmation, and receives the confirmation input. According to the confirmation input, the soundness confirmation input unit 33 outputs the soundness of the entire building determined by the soundness determination unit 31 or the corrected soundness to the soundness output unit 32, the soundness DB 34, the printer, a recording medium, a network, and the like. A soundness confirmation input unit corresponds to the above function of the soundness confirmation input unit 33.

The soundness determination unit 31 may accumulate the soundness of the entire building that is an inspection target after the confirmation input, the structure information of the building that is an inspection target, the position of the damage, the degree of damage, and the use environment history information (however, in a case where the use environment history information is used for the determination of the soundness) in the soundness DB 34 as new soundness information. A degree of a difference from actual soundness determined by professional personnel may be converted into statistical data and the soundness information of the soundness DB 34 including an element with this difference may be deleted or corrected to optimize the soundness information of the soundness DB 34. A storage control unit corresponds to the above function of the soundness determination unit 31.

Figure 6:
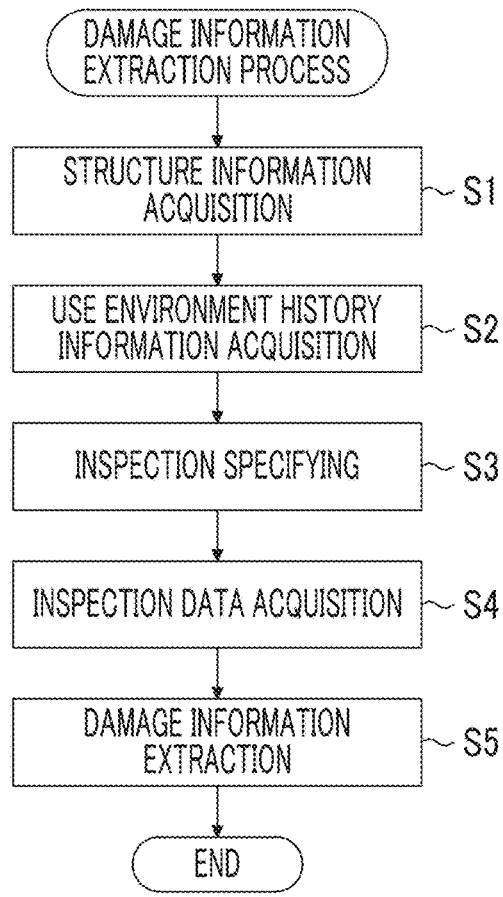
FIG. 6 is a flowchart of damage information extraction process.

FIG. 6 is a flowchart of a damage information extraction process that is executed by the damage information extraction device 200. A program for causing the damage information extraction device 200 to execute this process is stored in a computer-readable storage medium such as a flash memory of the damage information extraction device 200.

In S1 (structure information acquisition step), the inspection specifying unit 14 acquires the structure information of the building that is an inspection target from the structure information of the building accumulated in the building structure information DB 18.

In S2, the inspection specifying unit 14 acquires the use environment history information of the building that is an inspection target from the use environment history information accumulated in the use environment history information DB 17. A use environment information acquisition unit corresponds to the above function of the inspection specifying unit 14.

In S3 (inspection specifying step), the inspection specifying unit 14 specifies the member position that is an inspection target and a type of damage that is an inspection target at the member position on the basis of the structure information of the building acquired in S1 and the use environment history information acquired in S2. In a case where there is no use environment history information, the inspection specifying unit 14 specifies the member position that is an inspection target and the type of damage that is an inspection target at the member position on the basis of the structure information of the building acquired in S1.

In step S4 (inspection data acquisition step), the inspection data acquisition unit 15 acquires inspection data including image data obtained by imaging and recording a subject image of each member of an arbitrary building that is an inspection target, and position information of each member at which the image is recorded. As described above, respective members are evenly included as subjects in the image data.

In S5 (damage information extraction step), the inspection data analysis unit 16 acquires the image data corresponding to the member position specified as the inspection target by the inspection specifying unit 14 from the inspection data acquisition unit 15, analyzes the image data, and determines, from the image data, whether there is damage of the damage type specified as the inspection target, and the degree of damage in a case where there is the damage. Since the inspection data analysis unit 16 does not analyze the image data corresponding to the member position that is not specified as the inspection target, analysis of damage of an unimportant member is omitted. However, a member position not specified by the inspection specifying unit 14 is also designated individually as the member position that is the inspection target according to an instruction from the user, and then, can be analyzed by the inspection data analysis unit 16.

Through the above process, it is possible to extract damage information from image data corresponding to an important member position among image data in which each unspecified member of the building is a subject. Therefore, it is possible to efficiently obtain damage information of the important member position without spending time at an installation site of the building.

Figure 7:
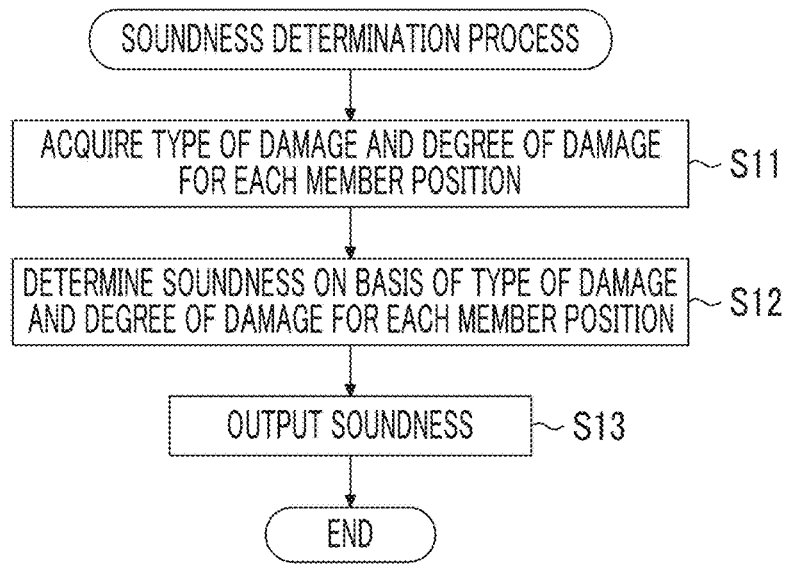
FIG. 7 is a flowchart of a soundness determination process.

FIG. 7 is a flowchart of the soundness determination process that is executed by the soundness determination device 300. A program for causing the soundness determination device 300 to execute this process is stored in a computer-readable storage medium such as a flash memory of the soundness determination device 300.

In S11, the soundness determination unit 31 acquires the type of damage and the degree of damage for each member position obtained in the damage information extraction process of the damage information extraction device 200.

In S12, the soundness determination unit 31 determines the soundness of the building that is an inspection target on the basis of the degree of damage at each member position. As described above, a way of determining the soundness may be any one of a way based on a rule, a way based on a statistical scheme, a way based on search of similar past cases, and a way based on a combination of some or all of the ways. However, the soundness determination unit 31 necessarily uses damage information including the type of damage and the degree of damage at each member position obtained by the damage information extraction device 200 for a soundness determination.

In S13, the soundness output unit 32 outputs the soundness determined in S12 to a display, a printer, or the like.

Through the above process, the damage information can be extracted from the image data corresponding to an important member position among image data in which each unspecified member of the building is set as a subject, and the soundness of the building can be efficiently determined from this damage information.

A range in which the present invention is applied is not limited to bridges, and the present invention can be generally applied to all buildings, including civil engineering structures such as tunnels, sheds, culverts, slope protections, retaining walls, dams, and revetments, and buildings such as apartments. That is, it is possible to determine an appropriate member position and an appropriate type of damage that are the inspection targets according to the type of building and a use environment thereof, and to determine the soundness of the building from image data or the like for each member position.

For example, it is assumed that the inspection target is a tunnel constructed using a pile construction scheme, and an installation place of the tunnel is a mountainous region of a cold place in the use environment history information. In this case, for lining, a longitudinal striking joint, a transverse striking joint, a transverse direction joint, a longitudinal direction joint, a vicinity of a top edge, a vicinity at a middle of a lining span are determined to be member positions that are inspection targets, and types of damage of the inspection target are cracks continuous to the joints and the top edge, cracks near the middle of the liner span, fragmentation of cracks due to such cracks, lifting, peeling, discoloration, leakage, and steps. This is intended to intensively inspect places at which cracks or the like easily occur due to thermal expansion and contraction. Further, in a case where a repaired place, a cold joint, and an occurrence place of a honeycomb are shown in the use environment history information, positions thereof are determined to be the member positions that are the inspection targets, and a deformation such as cracks at the positions is determined to be the type of damage that is the inspection target. This is because these are parts that are easily deformed due to a structural weakness.

The soundness of the building that is an inspection target is determined to be any one of three stages of "overall remarkable deterioration", "partial deterioration", and "no deterioration" according to the degree of damage at each of the member positions.

Alternatively, in a case where the inspection target is an RC building, image data in which a member constituting a frame such as a pillar, a beam, a wall, and a slab is a subject is recorded in association with a presence position of the member, the presence or absence of a type of damage corresponding to each member, such as a type of damage such as cracks, paint peeling, rebar exposure, painted surface chalking, and leakage, and a degree of the damage are detected from the image data, and the soundness of the building that is an inspection target is determined to be any one of three stages of "overall remarkable deterioration", "partial deterioration", and "no deterioration" according to the degree of damage.

The determination of the soundness in a building other than a bridge may be any one of a determination based on a rule, a determination based on a statistical scheme, a determination based on search of similar past cases, and a determination based on a combination of some or all of the ways.

EXPLANATION OF REFERENCES

14: inspection specifying unit
15: inspection data acquisition unit

16: inspection data analysis unit
17: use environment history information database
18: building structure information database
31: soundness determination unit
32: soundness output unit

What is claimed is:

1. A damage information extraction device comprising:
a structure information acquisition unit that acquires structure information of a building;
an inspection specifying unit that specifies an inspection position of the building and a type of inspection target damage on the basis of the structure information of the building acquired by the structure information acquisition unit;
an inspection data acquisition unit that acquires inspection data in which image data in which the inspection position of the building is set as a subject and the inspection position of the building are associated with each other; and
a damage information extracting unit that extracts damage information corresponding to the type of inspection target damage specified by the inspection specifying unit from the image data corresponding to the inspection position specified by the inspection specifying unit among the inspection data acquired by the inspection data acquisition unit.

2. The damage information extraction device according to claim 1, wherein
the structure information acquisition unit acquires structure information of the building from the image data in which the building is set as a subject.

3. The damage information extraction device according to claim 2, wherein
the damage information includes a position of damage and a degree of the damage corresponding to the type of inspection target damage.

4. The damage information extraction device according to claim 3, further comprising:
a storage unit that stores soundness information in which structure information, a position of damage, a degree of damage, and soundness of one or a plurality of buildings other than the building are associated with one another; and
a soundness determination unit that searches for soundness corresponding to the structure information, the position of damage, and the degree of damage of the other building similar to the structure information, the position of the damage, and the degree of the damage of the building, and determining the soundness of the building on the basis of the soundness of the other building that has been searched for.

5. The damage information extraction device according to claim 4, further comprising:
a soundness output unit that outputs the soundness of the building determined by the soundness determination unit.

6. The damage information extraction device according to claim 5, further comprising:
a soundness confirmation input unit that receives a confirmation input regarding suitability of the soundness of the building output by the soundness output unit; and
a storage control unit that stores the soundness of the building determined by the soundness determination unit in the storage unit in association with the structure information, the position of the damage, and the degree of the damage of the building, or for correcting the soundness of the building determined by the soundness determination unit and storing the corrected soundness of the building in the storage unit in association with the structure information, the position of the damage, and the degree of the damage of the building according to the confirmation input regarding suitability of the soundness of the building of which the input is received by the soundness confirmation input unit.

7. The damage information extraction device according to claim 1, wherein
the damage information includes a position of damage and a degree of the damage corresponding to the type of inspection target damage.

8. The damage information extraction device according to claim 7, further comprising:
a storage unit that stores soundness information in which structure information, a position of damage, a degree of damage, and soundness of one or a plurality of buildings other than the building are associated with one another; and
a soundness determination unit that searches for soundness corresponding to the structure information, the position of damage, and the degree of damage of the other building similar to the structure information, the position of the damage, and the degree of the damage of the building, and determining the soundness of the building on the basis of the soundness of the other building that has been searched for.

9. The damage information extraction device according to claim 8, further comprising:
a soundness output unit that outputs the soundness of the building determined by the soundness determination unit.

10. The damage information extraction device according to claim 9, further comprising:
a soundness confirmation input unit that receives a confirmation input regarding suitability of the soundness of the building output by the soundness output unit; and
a storage control unit that stores the soundness of the building determined by the soundness determination unit in the storage unit in association with the structure information, the position of the damage, and the degree of the damage of the building, or for correcting the soundness of the building determined by the soundness determination unit and storing the corrected soundness of the building in the storage unit in association with the structure information, the position of the damage, and the degree of the damage of the building according to the confirmation input regarding suitability of the soundness of the building of which the input is received by the soundness confirmation input unit.

11. The damage information extraction device according to claim 10, wherein
the soundness output unit outputs a part or all of the soundness information on the soundness of the other building that has been searched for together with the soundness of the building.

12. The damage information extraction device according to claim 9, wherein
the soundness output unit outputs a part or all of the soundness information on the soundness of the other building that has been searched for together with the soundness of the building.

13. The damage information extraction device according to claim 7, further comprising:
a use environment information acquisition unit that acquires use environment information of the building, wherein the inspection specifying unit specifies the inspection position of the building and the type of inspection target damage on the basis of the structure information of the building acquired by the structure information acquisition unit and the use environment information of the building acquired by the use environment information acquisition unit.

14. The damage information extraction device according to claim 13, further comprising:
a storage unit that stores soundness information in which structure information, a position of damage, a degree of damage, use environment information, and soundness of one or a plurality of buildings other than the building are associated with one another; and
a soundness determination unit that searches for soundness corresponding to the structure information, the position of damage, the degree of damage, and use environment information of the other building similar to the structure information, the position of the damage, the degree of damage, and the use environment information of the building and determining the soundness of the building on the basis of the soundness of the other building that has been searched for.

15. The damage information extraction device according to claim 14, further comprising:
a soundness output unit that outputs the soundness of the building determined by the soundness determination unit.

16. The damage information extraction device according to claim 15, further comprising:
a soundness confirmation input unit that receives a confirmation input regarding suitability of the soundness of the building output by the soundness output unit; and
a storage control unit that stores the soundness of the building determined by the soundness determination unit in the storage unit in association with the structure information, the position of the damage, the degree of the damage, and use environment information of the building, or for correcting the soundness of the building determined by the soundness determination unit and storing the corrected soundness of the building in the storage unit in association with the structure information, the position of the damage, the degree of the damage, and use environment information of the building according to the confirmation input regarding suitability of the soundness of the building of which the input is received by the soundness confirmation input unit.

17. The damage information extraction device according to claim 16, wherein
the soundness output unit outputs a part or all of the soundness information on the soundness of the other building that has been searched for together with the soundness of the building.

18. The damage information extraction device according to claim 15, wherein
the soundness output unit outputs a part or all of the soundness information on the soundness of the other building that has been searched for together with the soundness of the building.

19. A damage information extraction method which is executed by a computer, the method comprising:
a structure information acquisition step of acquiring structure information of a building;
an inspection specifying step of specifying an inspection position of the building and a type of inspection target damage on the basis of the structure information of the building acquired in the structure information acquisition step;
an inspection data acquisition step of acquiring inspection data in which image data in which the inspection position of the building is set as a subject and the inspection position of the building are associated with each other;
a damage information extracting step of extracting damage information corresponding to the type of inspection target damage specified in the inspection specifying step from the image data corresponding to the inspection position specified in the inspection specifying step among the inspection data acquired in the inspection data acquisition step; and
an outputting step of outputting, for use by a user, the damage information extracted in the damage information extracting step.

20. A non-transitory computer recordable recording medium storing a damage information extraction program for causing a computer to execute the soundness determination method according to claim 19.

* * * * *